Patented Feb. 19, 1952

2,586,191

UNITED STATES PATENT OFFICE 2,586,191

SALTS OF SULFONATED ETHERS OF HYDROGENATED CARDANOL AS INHIBITORS FOR MINERAL HYDROCARBON OILS

David Wasserman, New York, N. Y., assignor to The Harvel Corporation, a corporation of New Jersey No Drawing. Application August 21, 1948, Serial No. 45,565

5 Claims. (Cl. 252—33)

This invention relates to novel compositions of matter as well as to novel methods for producing them and also to novel combinations of one or more of said compositions of matter and a mineral hydrocarbon oil. In one of its specific aspects the invention is directed to novel derivatives of cardanol. These novel derivatives are ethers of metal salts of hydrogenated sulfonated cardanol. In another of its specific aspects the invention is directed to improving mineral hydrocarbon oils and especially those having flash points no lower than 250° F. by adding thereto a quantity of one or more of said salts of the sulfonated hydrogenated cardanol ethers.

The mineral hydrocarbon oils which are preferably employed are the motor lubricating oils, aviation oils, diesel oils and turbine oils. I have discovered that the addition of a small amount of one or a mixture of two or more of said ether salts to said oils provides oils of improved anti-corrosion and anti-oxidant characteristics. These novel ether salts are especially suitable as additives for those hydrocarbon oils which normally cause corrosion and are subject to oxidation in conditions of service.

These novel ether salts may be incorporated in said oils in varying proportions and generally the ratio by weight of the oil to the novel ether salt incorporated therein is in the range of 1000–0.1 to 100–5. The ratio is dependent upon the particular ether salt or combination of ether salts employed, the particular and service requirement of the oil and the degree of improvement required.

I have discovered that said ether salts serve primarily as stable detergents and anti-oxidants under heavy duty conditions for said oils. My experiments by means of the well known "Underwood Oxidation Tests" have established that the addition of one or more of said novel ether salts to said oils render them less corrosive, more resistant to oxidation, inhibit the increase in viscosity at 5 hours and 10 hours of service and in some cases the viscosity at the end of those periods is less than that of the oil per se, reduces the neutralization number, naphtha insoluble sludge and Ramsbottom carbon at 5 hours and 10 hours of service.

The novel compounds of this invention are those salts of sulfonated ethers of hydrogenated cardanol in its substantially pure condition. These compounds have the following general formula:

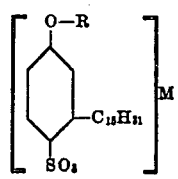

in which R is an alkyl hydrocarbon primary, secondary or tertiary group of any number of carbon atoms and M is a metal and preferably sodium, potassium, lithium, strontium, calcium, barium, tin, aluminum, zinc, bismuth, beryllium, cadmium, lead, titanium, iron, nickel, cobalt, copper, etc. However, in most cases I prefer that M be zinc, calcium or barium.

The hydrogenated cardanol may be prepared in a number of different ways. Ordinarily it may be produced by recovering a particular distillate of hydrogenated cashew nut shell liquid. The cashew nut shell liquid employed as one of the starting ingredients may be the raw cashew nut shell liquid obtained either by the solvent extraction of said liquid from said nuts by using a hot cashew nut shell liquid bath as set forth in U. S. patent to E. R. Hughes, No. 2,058,456 of October 27, 1936. It is preferable to first treat the raw cashew nut shell liquid with a small amount of an acidic agent to remove therefrom any naturally occurring metals and amines as set forth in the patents to Harvey et al., Nos. 2,128,247 of August 30, 1938, or 2,067,919 of January 19, 1937. The so-treated cashew nut shell liquid has long been known as treated cashew nut shell liquid. This treated cashew nut shell liquid is subjected to hydrogenation treatment in order to completely hydrogenate only the unsaturated side chains of the various phenols therein. This hydrogenation may be accomplished by following the method set forth in U. S. patent to S. Caplan, No. 2,181,119 of November 28, 1939. Then after only the unsaturated side chains of the various phenols in said cashew nut shell liquid are saturated with hydrogen, the hydrogenated cashew nut shell liquid is subjected to distillation under low pressure conditions. It may be distilled at a vapor temperature of 530° F. and at 30 mm. of mercury pressure. Distillation is continued under these conditions until the distillate recovered is between about 50% to 70% by weight of the hydrogenated cashew nut shell liquid subjected to this distillation. The recovered distillate is hydrogenated cardanol, technical grade and is distilled and a fraction of substantially pure hydrogenated cardanol (M. P. 50–51° C.) is recovered and has the following structural formula:

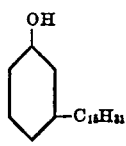

The substantially pure hydrogenated cardanol may then be converted to an ether by reacting it with an alkyl ester, such as diethyl sulphate, ethyl chloride, etc., in the presence of an alkali such as sodium hydroxide to produce an ether of the following formula:

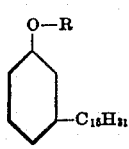

in which R is a hydrocarbon radical.

Then the ether may be sulfonated and then its metal salt produced. The same compounds may be produced by first sulfonating the hydrogenated cardanol and then providing the ether formation of the sulfonated hydrogenated cardanol and salt formation. However, I prefer to employ the former method.

The following examples are given merely by way of illustrating the various methods which may be employed for the production of illustrative compounds of this invention.

EXAMPLE 1

A. *Preparation of dodecyl ether of hydrogenated cardanol [dodecyl( 3-pentadecyl) phenyl ether]*

To 112.2 grams (0.368 mole) of purified hydrogenated cardanol (3-pentadecyl phenol) (melting at 50–51° C.) in 300 cc. of butyl carbitol was added a solution of 15.5 grams (0.368 mole) of sodium hydroxide in 20 cc. of water. The water was removed by distillation in vacuo and 82 grams (0.335 mole) of lauryl chloride was added. The mixture was refluxed for 4 hours and slowly precipitated sodium chloride from solution. The sodium chloride was removed by filtration while hot and the filtrate was vacuum distilled at 0.004 mm. The ether, after removal of 22 grams of unreacted starting material, distilled at 200–225° C. and weighed 144 grams (82.6% yield). The clear colorless oil solidified at room temperature and was found to melt at 27–29° C. and had the following formula:

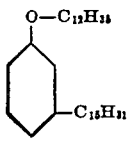

B. *Preparation of zinc dodecyl ether of sulfonated hydrogenated cardanol [zinc bis(2-pentadecyl, 4-dodecoxy benzene sulfonate)]*

23.6 grams (0.05 mole) of dodecyl ether of hydrogenated cardanol was dissolved in 150 cc. of alcohol-free, dry chloroform in a three-necked flask equipped with stirrer, addition funnel and reflux condenser. A solution of 5.83 grams (0.05 mole) of chlorosulfonic acid in 25 cc. of $P_2O_5$-dried chloroform was added dropwise to the stirred solution of the ether at room temperature (25–30° C.) and the mixture stirred for 3 hours. The temperature was slowly raised over a period of 1 hour until the chloroform boiled and no more hydrogen chloride gas was evolved (1 hour). The chloroform was removed in vacuo and the red-brown residue (2-pentadecyl, 4-dodecoxy benzene sulfonic acid) dissolved in 95% ethanol. An alcoholic solution of zinc acetate was added with stirring until the acid was neutralized. The precipitate was filtered and the filtrate was evaporated to dryness. Both were vacuum dried at 60° C. and weighed 29.0 grams. An ash as the sulfate was taken of both.

Theory for $(C_{66}H_{120}O_5S_2)_2$ Zn.$6H_2O$ : 12.62% as $ZnSO_4$
Filtrate residue : 12.50% as $ZnSO_4$
Precipitate dried : 12.81% as $ZnSO_4$ Thus the zinc salt is pure. It was soluble to more than 50% concentration in S. A. E. 30 motor oil at 100–120° C., and soluble to at least 1% at 20° C., and had the following formula:

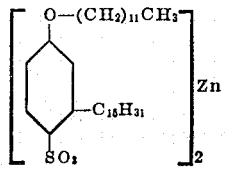

The magnesium and calcium salts were also similarly soluble and may be produced by substituting the magnesium or calcium acetate for the zinc acetate.

EXAMPLE 2

*Preparation of the zinc salt of the mono sulfonated dodecyl ether of hydrocardanol [zinc bis (2-pentadecyl-4-dodecoxy benzene sulfonate)]*

To 0.5 mole of 3-pentadecyl phenol in a 1-liter 3-necked flask was added 250 cc. of chloroform and then dropwise at room temperature 0.55 mole of chlorosulfonic acid. After 1 hour of stirring, the temperature was raised to reflux and the material was refluxed until no more HCl was evolved (2 hours). The $CHCl_3$ was removed in vacuo and recrystallized from heptane once. The heptane was removed from the solid by evacuating at 200° C. in the vacuum oven for 3 to 4 hours in a crystallizing dish. This was dissolved in water and neutralized with sodium bicarbonate. The resulting white precipitate was filtered and dried, and is sodium 2-pentadecyl, 4-hydroxy benzene sulfonate.

To 40.7 grams (0.1 mole) of sodium 2-pentadecyl, 4-hydroxy benzene sulfonate was added 4.0 grams of sodium hydroxide in 30 cc. of water and 200 cc. of butanol. Upon heating, a homogeneous solution formed and all the water was removed with excess butanol. 100 cc. of ethylene glycol was added and most of the butanol removed in vacuo. 24.9 grams (0.10) of dodecyl bromide was added and refluxed one hour at 120° C., and the butanol distilled off so that the temperature of the mixture went up to 200° C. It was refluxed at this temperature for 4 hours. The reaction mixture was neutral indicating completion of reaction. It was then cooled to room temperature and iso-hexane added to extract the unused lauryl bromide and lauryl alcohol (side reaction). The ethylene glycol layer was poured into hot water and after adding 200 cc. of 10% sulfuric acid, the solution was extracted with hot butanol in three 200 cc. extractions. The combined butanol extracts were washed with two 200 cc. portions of hot dilute sulfuric acid (10%) to remove any sodium sulfate and leave the free sulfonic acid in the butanol layer. The excess sulfuric acid was washed out with three 200 cc. portions of hot water and the volatile materials in the butanol layer removed in vacuo (butanol and water). To one-half (20 gm.) of the sulfonic acid residue was added 400 cc. of hot water which dissolved the acid, and a solution of 4.42 grams of zinc acetate in 25 cc. of hot water was then added dropwise with stirring. The precipitate was permitted to settle for 1 hour, the supernatant liquid filtered and the wet precipitate was dried in the vacuum oven at 50° C. Yield was 7 grams of salt. Same solubility as other preparation of Example 1.

Upon neutralization of another portion of 2-pentadecyl, 4-dodecoxy benzene sulfonic acid with barium hydroxide, the dry barium salt on filtration and oven drying was found to be insoluble in oil in a concentration as low as 0.25% and is not soluble enough to be used as effectively as the zinc salt. The resultant compound had the same formula as the zinc compound except that barium was substituted for the zinc.

EXAMPLE 3

*Preparation of sodium 2-pentadecyl, 4-methoxy benzene sulfonate*

40.7 grams of sodium 2-pentadecyl, 4-hydroxy benzene sulfonate was dissolved in 100 cc. of water containing 4.0 grams of sodium hydroxide and 10 cc. of n-butanol forming the disodium salt. The mass was stirred and warmed to dissolve the salt and then 12.7 grams of dimethyl sulfate was added under a reflux condenser using a three necked flask as the reaction vessel. After the last addition of dimethyl sulfate the mixture was refluxed for 10 minutes. 2.0 grams of sodium hydroxide in 10 cc. of water was added and then 6.3 grams of dimethyl sulfate. The mixture was refluxed for 15 minutes and then processed. A small amount of NaOH was added to neutralize the boiling mixture. The mixture was extracted with hot butanol using two 300 cc. batches of extractant. The butanol layer was washed once with hot water and then the water dissolved in the butanol was distilled off with 100 cc. of butanol. The butanol solution remaining was cooled overnight to yield 26 grams of solid sodium 2-pentadecyl, 4-methoxy benzene sulfonate.

After evaporating down to 200 cc. the filtrate yielded another 10 grams of salt. The total yield was 36 grams. A portion of this salt was converted to the zinc salt as in Example 2. The zinc bis (2-pentadecyl, 4-methoxy benzene sulfonate) was soluble up to 1% in oil at 140–150° C. but only soluble up to 0.2% at room temperature.

The above additives were tested in the Underwood oxidation test apparatus. A 2700 cc. (2430 g.) portion of phenol-extracted mineral oil, S. A. E. 30, viscosity 169.4 and 214 seconds at 130° F. on the Saybolt Universal viscosimeter, was taken for each run. To this was added 2.83 g. of a 6% ferric naphthenate solution, resulting in a 0.01% concentration of $Fe_2O_3$ in the oil, and 0.825 to 1% by weight of each additive. The oil was sprayed on two copper-lead and two cadmium-silver bearings through 0.01" holes at a distance of two inches, and 10 lbs. p. s. i. pressure. The oil was kept at 162° C. during the entire run. After the first five hours the Cu-Pb and Ag-Cd bearings were removed, weighed and replaced with freshly sanded bearings for the second five hour run. The copper-lead bearings measured 32.5 mm. x 38.5 mm. surface area, and the silver-cadmium bearings 30.8 mm x 46.0 mm. surface area. Weight losses were noted after washing in a mixture of equal parts of ethyl acetate, toluol and ethanol. Other determinations are indicated in the chart below.

UNDERWOOD OXIDATION TEST—KENDALL 95% RAFFINATE #80179

[Initial viscosity of oil 130° F. was 169.4 seconds.]

| Additive | Viscosity at 130° F. Seconds—Saybolt Universal | | | | Cadmium Silver Bearings, Loss—Grams | | Neutralization Number | | Naphtha Insoluble, Per Cent | | Ramsbottom Carbon, Per Cent | |
|---|---|---|---|---|---|---|---|---|---|---|---|---|
| | 5 hrs. | Per Cent Inc. | 10 hrs. | Per Cent Inc. | 5 hrs. | 10 hrs. | 5 hrs. | 10 hrs. | 5 hrs. | 10 hrs. | 5 hrs. | 10 hrs. |
| Base Oil | 262 | 54.5 | 412 | 142.0 | 0.3958 | 0.8220 | 2.75 | 1.40 | 0.61 | 6.13 | 1.83 | 3.82 |
| 0.825% Zinc Lauryl (3-pentadecyl) phenyl sulfonate | 183 | 7.6 | 198 | 16.5 | 0.1138 | 0.1089 | 0.60 | 1.30 | 0.31 | 1.42 | 0.64 | 1.08 |
| 1% Magnesium Octadecyl (3-pentadecyl) phenyl sulfonate | 199 | 17.05 | 241 | 41.7 | 0.4677 | 0.7653 | 1.42 | 1.89 | 0.34 | 1.67 | 1.09 | 2.01 |
| 1% Zinc Stearate | 212 | 24.7 | 263 | 54.6 | 0.6984 | 1.0274 | 1.59 | 1.74 | 0.38 | 1.49 | 1.50 | 2.54 |
| 1% Sulfurized Cardanol methyl Ether | 245 | 44.2 | 437 | 157.0 | 0.3072 | 0.6835 | 5.25 | 5.40 | 1.58 | 7.59 | 1.45 | 3.88 |

UNDERWOOD OXIDATION TEST—KENDALL 95% RAFFINATE #80328

[Initial viscosity of oil 130° F. was 214 seconds.]

| Additive | Viscosity at 130° F. Seconds-Saybolt Universal | | | | Cadmium Silver Bearings, Loss—Grams | | Neutralization number | | Naphtha insoluble, Per Cent | | Ramsbottom Carbon, Per Cent | | Copper-Lead Bearings | |
|---|---|---|---|---|---|---|---|---|---|---|---|---|---|---|
| | 5 hrs. | Per Cent Inc. | 10 hrs. | Per Cent Inc. | 5 hrs. | 10 hrs. | 5 hrs. | 10 hrs. | 5 hrs. | 10 hrs. | 5 hrs. | 10 hrs. | 5 hrs. | 10 hrs. |
| Base Oil | 312 | 92.2 | 504 | 135 | 0.3756 | 0.9248 | 2.59 | 1.96 | 0.59 | 3.75 | 1.73 | 3.68 | 0.0512 | 0.2644 |
| 1% Lauryl (3-pentadecyl) phenyl sulfonate | 152 | −14.9 | 212 | −1.0 | 0.0891 | 0.1720 | 0.23 | 0.38 | 0.35 | 1.78 | 0.88 | 1.28 | 0.1112 | 0.1207 |
| 1% Zinc Octadecyl (3-pentadecyl) phenyl Sulfonate | 229 | 7.0 | 280 | 30.8 | 0.2506 | 0.5364 | 0.30 | 0.83 | 0.07 | 1.68 | 0.81 | 1.31 | 0.0452 | 0.0777 |
| 1% Calcium Lauryl (3-pentadecyl) phenyl Sulfonate | 244 | 14.0 | 321 | 50.0 | 0.3547 | 0.6578 | 1.29 | 2.63 | 0.20 | 1.33 | 1.32 | 2.71 | 0.1568 | 0.2731 |
| 0.58% Zinc Naphthenate | 253 | 18.2 | 341 | 59.4 | 0.4580 | 0.8469 | 2.19 | 2.34 | 0.14 | 2.03 | 1.41 | 4.10 | 0.1036 | 0.2084 |

It is seen from the chart that the zinc lauryl 3-pentadecyl phenyl sulfonate is the best detergent tested. Although it was not primarily prepared for its anti-oxidant properties, it also shows good oxidation and corrosion inhibition. Thus in 1% concentration it reduces the viscosity at five and ten hours below that of the starting oil which is quite remarkable. Its excellent corrosion inhibition is shown at 0.83% in reducing corrosion at 5 hours to one-fourth, and after 10 hours to less than one-seventh that of the base oil. Neutralization number was reduced after five hours to less than one-fourth, that of the base oil naphtha insoluble (sludge) was reduced to one-half after five hours, to one-fourth after 10 hours of the base oil. Ramsbottom carbon was reduced to one-third at 5 hours, and one-fourth at 10 hours. In a 1% concentration it showed slight corrosion after 5 hours on a copper-lead bearing, but after 10 hours, the corrosion loss was cut in half.

Thus I have developed a good stable non-corrosive detergent that stands up under heavy duty conditions.

I claim:

1. A novel composition selected from the group consisting of motor lubricating oils, aviation oils, diesel oils and turbine oils and comprising a mineral hydrocarbon oil whose flash point is no lower than 250° F. and a compound for improving the corrosion and oxidation characteristics of said oil in service, the ratio by weight of said oil to said compound being in the range of 1000–0.1 to 100–5, said compound having the following formula:

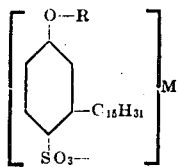

where R is an alkyl hydrocarbon group and M is a metal.

2. A novel composition selected from the group consisting of motor lubricating oils, aviation oils, diesel oils and turbine oils and comprising a mineral hydrocarbon oil whose flash point is no lower than 250° F. and a compound for improving the corrosion and oxidation characteristics of said oil in service, the ratio by weight of said oil to said compound being in the range of 1000–0.1 to 100–5, said compound having the following formula:

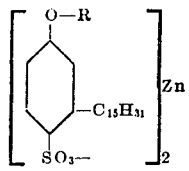

where R is an alkyl hydrocarbon group.

3. A novel composition selected from the group consisting of motor lubricating oils, aviation oils, diesel oils and turbine oils and comprising a mineral hydrocarbon oil whose flash point is no lower than 250° F. and a compound for improving the corrosion and oxidation characteristics of said oil in service, the ratio by weight of said oil to said compound being in the range of 1000–0.1 to 100–5, said compound having the following formula:

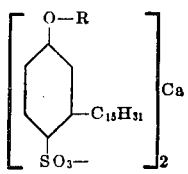

where R is an alkyl hydrocarbon group.

4. A novel composition selected from the group consisting of motor lubricating oils, aviation oils, diesel oils and turbine oils and comprising a mineral hydrocarbon oil whose flash point is no lower than 250° F. and a compound for improving the corrosion and oxidation characteristics of said oil in service, the ratio by weight of said oil to said compound being in the range of 1000–0.1 to 100–5, said compound having the following formula:

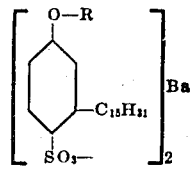

5. A novel composition selected from the group consisting of motor lubricating oils, aviation oils, diesel oils and turbine oils and comprising a mineral hydrocarbon oil whose flash point is no lower than 250° F. and a compound for improving the corrosion and oxidation characteristics of said oil in service, the ratio by weight of said oil to said compound being in the range of 1000–0.1 to 100–5, said compound having the following formula:

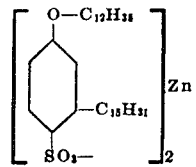

DAVID WASSERMAN.

REFERENCES CITED

The following references are of record in the file of this patent:

UNITED STATES PATENTS

| Number | Name | Date |
|---|---|---|
| 2,184,935 | Bruson | Dec. 26, 1939 |
| 2,197,835 | Reiff | Apr. 23, 1940 |
| 2,205,950 | Flett | June 25, 1940 |
| 2,324,300 | Harvey | July 13, 1943 |
| 2,337,924 | Platz | Dec. 28, 1943 |
| 2,361,353 | Otto | Oct. 24, 1944 |
| 2,377,552 | Harvey | June 5, 1945 |
| 2,402,288 | Lazar et al. | June 18, 1946 |
| 2,411,583 | McNab et al. | Nov. 26, 1946 |
| 2,413,188 | Musselman | Dec. 24, 1946 |